United States Patent
Carrino

(10) Patent No.: US 7,301,450 B2
(45) Date of Patent: Nov. 27, 2007

(54) CITIZEN COMMUNICATION CENTER

(76) Inventor: John Carrino, 44 Sylvan Pl., Nutley, NJ (US) 07931

( * ) Notice: Subject to any disclaimer, the term of this patent is extended or adjusted under 35 U.S.C. 154(b) by 15 days.

(21) Appl. No.: 11/374,820

(22) Filed: Mar. 14, 2006

(65) Prior Publication Data

US 2007/0216535 A1   Sep. 20, 2007

(51) Int. Cl.
    *G08B 1/08* (2006.01)
(52) U.S. Cl. .................. 340/539.11; 340/539.1; 340/539.24; 340/539.13; 340/825.49
(58) Field of Classification Search .......... 340/539.11, 340/539.1, 539.24, 825.06, 825.49
    See application file for complete search history.

(56) References Cited

U.S. PATENT DOCUMENTS

| | | | |
|---|---|---|---|
| 6,002,748 A | 12/1999 | Leichner | 379/48 |
| 6,147,601 A * | 11/2000 | Sandelman et al. | 340/506 |
| 6,329,904 B1 | 12/2001 | Lamb | 340/286.02 |
| 6,400,265 B1 | 6/2002 | Saylor et al. | 340/531 |
| 6,462,665 B1 | 10/2002 | Tarlton et al. | 340/601 |
| 6,661,340 B1 | 12/2003 | Saylor et al. | 340/517 |
| 6,747,557 B1 | 6/2004 | Petite et al. | 340/540 |
| 6,823,263 B1 * | 11/2004 | Kelly et al. | 702/3 |
| 6,914,525 B2 | 7/2005 | Rao et al. | 340/351 |
| 2002/0075155 A1 | 6/2002 | Guillory | 340/601 |
| 2002/0145514 A1 | 10/2002 | Dawson | 340/506 |
| 2003/0069002 A1 | 4/2003 | Hunter et al. | 455/404.2 |
| 2003/0202663 A1 | 10/2003 | Hollis et al. | 380/282 |
| 2003/0222777 A1 | 12/2003 | Sweatt | 340/539.1 |
| 2004/0103158 A1 | 5/2004 | Vella et al. | 709/206 |
| 2004/0152493 A1 | 8/2004 | Phillips et al. | 455/567 |
| 2005/0027741 A1 | 2/2005 | Eichstaedt et al. | 707/104.1 |
| 2005/0027742 A1 | 2/2005 | Eichstaedt et al. | 707/104.1 |
| 2005/0030977 A1 | 2/2005 | Casey et al. | 370/485 |
| 2005/0031095 A1 | 2/2005 | Pietrowicz | 379/88.18 |
| 2005/0031096 A1 | 2/2005 | Postrel | 379/88.22 |
| 2005/0197775 A1 | 9/2005 | Smith | 702/3 |

FOREIGN PATENT DOCUMENTS

| | | |
|---|---|---|
| EP | 1209886 | 5/2002 |
| JP | 03201758 A | 9/1991 |
| JP | 2003242580 A | 8/2003 |

* cited by examiner

*Primary Examiner*—Daryl C Pope
(74) *Attorney, Agent, or Firm*—Ernest D. Buff & Associates, LLC; Ernest D. Buff; Theodore J. Pierson

(57) ABSTRACT

A versatile Citizen Alert System is connected to Internet and private databases to acquire real time information useful for subscribed users. During registration, users are required to provide multimedia contact information, including telephone numbers, cell phone numbers, pager information, Blackberry or PDA information, e-mail address, and physical address, along with user defined sensitivities to alerts, including sensitivities to natural emergencies, man made emergencies and professional requirements. The system has a local or remote administrator that constantly analyzes the acquired data in accordance with requirements of each and every user, orders the data to generate alert information specific to a user, and communicates the alert to each and every user using multiple delivery platforms. A user specific, secured web page providing details of alert and hyperlinks constitutes an additional information source.

12 Claims, 1 Drawing Sheet

CITIZEN COMMUNICATION CENTER

BACKGROUND OF THE INVENTION

1. Field of the Invention

The present invention relates to emergency warning systems; and, more particularly, to a system for immediately alerting citizens within a targeted geographical area to a crisis, emergency or important event by broadcasting alert information over multiple delivery platforms.

2. Description of the Prior Art

Emergency warning systems that provide alert information to users have been proposed by prior art workers. These systems typically facilitate mass distribution of warning alerts that notify the public of severe weather conditions, chemical emergencies, traffic hazards, earthquakes, fires, explosions and the like.

U.S. Pat. No. 6,002,748 to Leichner discloses a disaster alert by telephone system. Local telephone exchanges in a threatened geographical area connect to their subscribers and transmit a recorded warning message. This is accomplished in response to transmission of threat data communicated from one of several remote computer terminals to a central computer. The central computer has a data storage device upon which is stored a local exchange database and preferably recorded warning messages. Upon receipt of the threat data from the remote computer terminal, the central computer is connected in communication with the local exchanges in the threatened geographical area and instructs the local exchanges to connect to its subscribers and provides instructions or a warning message to be played to the subscribers who go off-hook. This system provides machine generated voice messages. There is no administrator screening disaster alert data with regard to relevance to individual users. The disaster alert is only delivered by telephone and is unavailable to a person not adjacent to a telephone.

U.S. Pat. No. 6,329,904 to Lamb discloses an apparatus and method for providing weather and other alerts. This apparatus includes a digital broadcasting unit that broadcasts short digital pulses using a wireless network representing an alert code that is specific to a particular region. The digital alert code is received by a powered receiver with a microprocessor that interprets the received alert code of level 1, level 2 type and displays alerts in a variety of output devices. The broadcasting unit communicates only with the digital receiver by a special digital code and does not provide alert to cell phones by text messages, to pagers or by e-mail. The alert message is not screened by an administrator. The broadcasting unit communicates with all digital receivers without reference to a specific user list.

U.S. Pat. No. 6,400,265 to Saylor et al. discloses a system and method for monitoring security systems by using video images. The system wirelessly monitors images of personal properties and individuals within a user location and compares changes in images to determine if an alarm event has occurred. The central system may communicate the alarm event to the user or authorities or persons in a contact list. The system may also receive manually triggered alarms initiated by a user using wireless transmission. This system does not communicate to the user an alarm event for a particular location created by authorities including police, weather related events or catastrophic events. In the primary mode of the disclosure, the system only uses images and looks for changes in images which is generally insufficient to detect an alarm event.

U.S. Pat. No. 6,462,665 to Tarlton et al discloses a method and apparatus for sending a weather condition alert. This weather alert station uses standard broadcast weather alert warnings by government agencies including National Oceanic and Atmospheric Administration (NOAA), and NOAA sub-organizations, including the National Weather Service (NWS) and the Emergency Managers Weather Information Network (EMWIN), the U.S. Geological Survey (USGS) and other federal agencies, parses the alert data to user specific location and risk tolerance and passively sends alert signals via pager to subscribed users. The weather alert does not respond to any alert situation other than weather related alerts. It communicates only through a pager and does not use multiple means of alerting the user.

U.S. Pat. No. 6,661,340 to Saylor et al. discloses a system and method for connecting security systems to a wireless device. This patent disclosure is very similar to U.S. Pat. No. 6,400,265 to Saylor et al. discussed above. The only difference is several sensors are wirelessly connected to the central security network, not just image processing sensors. These user-provided security devices may be video security monitors, intrusion alarms, personal panic devices and the like as long as they are set to wirelessly communicate with the central security network. This communication requirement imposes a serious limitation on the type of wireless sensors and devices. In addition, for the central security system to recognize a particular type of alarm, these user-provided security devices must provide additional information, such as type of alarm and the like, which is generally not permitted by the software requirements of the central security system. As a result, any old user-provided security or alert system may not communicate properly with the central security system.

U.S. Pat. No. 6,747,557 to Petite et al. (hereinafter, "the '557 patent") discloses a system and method for signaling a weather alert condition to a residential environment. A severe weather alert system is provided for communicating weather conditions to remote locations, such as inside of residential homes, offices, or businesses. A modified smoke detector is provided with an integrated RF receiver for receiving message packets containing information that may be conveyed through its speaker, buzzer, or other sound-emanating device. This system detects only severe weather conditions and does not detect other emergency situations. The RF transmitters only communicate with modified smoke detectors and do not communicate to the user by any other communication channels.

U.S. Pat. No. 6,914,525 to Rao et al. discloses an alert system and method for geographic or natural disasters utilizing a telecommunications network. The system uses a number of wireless sensor modules that communicate wirelessly with a control center. The wireless sensor modules use photo interrupters, proximity switches, sliding switches, mercury switches, ultrasonic sensors and strain gauges to detect water level, earth movement, position shifts, vibration and acceleration and analyze geographic or natural disaster potential in the monitored area and issue alerts for imminent geographic or natural disasters. The system only collects events as they occur such as earth movement, floods etc. It does not collect data of potential disasters from any sources other than installed sensors. The system is only sensitive to geographic or natural disasters that are detectable by installed sensors, which are water level, earth movement as manifested by earth displacement, velocity of movement and acceleration of movement.

U.S. Patent Application No. 2002/0075155 to Guillory discloses a system for selective notification of severe weather events. This system sends an effective warning signal to receivers in a predetermined area. The system uses one or more control stations, which transmit digitally alerts for severe weather events. The digital code includes an activation code for receivers in selected sectors. The digital code activates these receivers in the target sectors sounding the severe weather alert alarm. This is an alert transmission system that controls the issue of alert warnings to target sectors. This system does not alert individual subscribed users of alerts, but rather activates receiver boxes. The alert information is not communicated to users by multiple modes of communications. The system is only sensitive to weather alerts as determined by authorities.

U.S. Patent Application No. 2002/0145514 to Dawson discloses an emergency call system using wireless, direct connect and telephone subsystems providing integration into a single head-end platform at least one of direct connect (hard-wired), wireless and telephone subsystems. The system uses wireless, hard wired and telephone connected alert generating subsystems that communicate with a single head end platform through a data bus, which generates alert signals. The alert signal is displayed in an LCD enunciator, and the system uses paging output, Internet generated e-mail and voice mail communicating with the user of the alert signal. This system does not collect emergency situations other than that generated by the wireless, hard wired or telephone devices connected to the system. There is no administrator within the system and the alert signal is not tailored according to the subscribed user preferences.

U.S. Patent Application No. 2003/0069002 to Hunter et al. discloses a system and method for emergency notification content delivery. This method is for the dissemination of emergency notification content from an emergency originating source. A number of emergency notification originating sources communicate with an emergency notification delivery system. These notification sources include emergency notification sources and remotely located sensors. These sensor devices may include GPS location providers, detectors for hazardous chemicals, radiation sources, toxic chemicals and gases, biohazard, shock from blast, tornado or earthquake. The emergency notification is delivered to a user device selected from a user database that lists user contact information including pager, PDA, cellular or conventional telephony. These devices do not provide an acknowledgement of the receipt the emergency notification content. The emergency notification content delivery system only receives emergency notification content from emergency originating sources, not from all sources available. It does not tailor the emergency notification according to the preferences of a subscribed user since the user database does not contain all the emergency preferences and sensitivities of the user.

U.S. Patent Application No. 2003/0202663 to Hollis et al. discloses a system and method for secure message-oriented network communications. This message-oriented middleware solution is for securely transmitting messages and files across public networks unencumbered by intervening network barriers implemented as security measures. It also provides a dynamic, dedicated, application level Virtual Private Network (VPN) solution that is facilitated by the message-oriented middleware. Standard encryption algorithms are used to minimize the threat of eavesdropping and an Open-Pull Protocol (OPP) that allows target nodes to pull and verify the credentials of requesters prior to the passing of any data by using key authority which comprises generating a set of public-private key pairs and a uniform resource identifier. The security network provides a dynamic, private transport for sensitive data over existing non-secure networks without the overhead and limited security associated with traditional VPN solutions. The system uses open pull protocol and verification key pairs to enable encrypted information transfer between nodes. This system provides a secure communication protocol and does not collect and distribute alert notifications.

U.S. Patent Application No. 2003/0222777 to Sweatt discloses an emergency warning network. A base station broadcasts a waning signal to an earth orbiting satellite which extends the warning signal to a first substation adapted to broadcast the received warning signal to portable receivers. The satellite also sends the warning signal to a second substation which, in turn, broadcasts the warning signal to a second earth orbiting satellite, adapted to broadcast the warning signal to a third substation that services additional portable receivers. This emergency warning network broadcasts the same warning signal to a large geographical area. Hence, the warning signal cannot satisfy any local emergency need and is at best a general warning. The use of earth orbiting satellites requires sufficient communication power from all the substations used, and therefore is inaccessible to remote areas. Moreover, the portable receivers have to be in close proximity with the substations, with the result that the system cannot service remote areas. The system does not provide emergency alerts according to the preferences of the user. Alerts messages are not communicated to a user using multiple platforms; but rather are communicated only through a portable receiver.

U.S. Patent Application No. 2004/0103158 to Vella et al. discloses a cellular messaging alert method and system. This system utilizes existing wireless communication devices and networks, such as cellular phones and carriers, as an underlying infrastructure in providing emergency information to a targeted percentage of the population in a specified geographical location, without requiring individuals to subscribe to an alerting service and without using information solicited from or provided by the intended recipients of the alert. The alert message is created when an Internet user, or originator, whose authority is first verified, communicates with a web-based server. The system accesses cell phone databases to determine the number of cell phones present within the target area. The system sends SMS messages to each of the cell phones in the target area notifying them of the alert situation without being initially prompted by the cell phone user. This alert message is delivered to all users as an unsolicited broadcast. The alert message may not meet any of the user's emergency alert preference requirements. The alert message is initiated and provided by the originator, a person of authority, and may not always protect the cell phone user as alert recommendations change and develop radically as a function of time. The system informs the originator via email that the alert message has been delivered.

U.S. Patent Application No. 2004/0152493 to Phillips et al. discloses methods, systems and apparatus for selectively distributing urgent public information. The method comprises maintaining a distribution address associated with each of the alert gateways. The distribution address for a particular alert gateway can provide sufficient identifying information about the alert gateway to allow an alert to be transmitted to the alert gateway. The method further includes associating at least one gateway characteristic for a particular alert gateway with the distribution address for that particular alert gateway. In some cases, the method will include receiving an alert. The alert can have associated information about the alert, for example, information about the urgency of the alert, the applicable time and/or date for the alert, and the like. The information about the alert can include geographic information about a geographic area to which the alert pertains such that subscribers outside the geographic area would be relatively unlikely to be interested in receiving the alert. Since each gateway pertains to one specific characteristic of the user, the combination of characteristics, typically required by the user is not readily accessed. The system does not gather alerts pertinent to the preferences of a user, but focuses instead on geographical locations. It merely creates distribution address lists for each of the gateways.

U.S. Patent Application No. 2005/0027741, 2005/0027742 to Eichstaedt et al. discloses a method and system for alert delivery architecture. This alert delivery system polls source contents including a variety of content information such as personal advertisements, shopping prices, news articles, and the like. It also accesses stock quotes, auction bids, and the like that may already be provided as an alert from a topical service. The second patent application uses a multiple number of pollers to validate data and updates the data (if the data content needs to be updated) prior to the delivery of the alert. This alert system does not facilitate collection of alerts that pose imminent emergency situations. There is no administrator within the system architecture that prioritizes gathered information according to user's preferences. The system is not connected to the Internet or to private intranets.

U.S. Patent Application No. 2005/0030977 to Casey et al. discloses alert gateway, systems and methods. These alert gateway, systems and methods distribute urgent public information. The alert gateway device receives urgent public information, such as an alert message from an external alert source including Emergency Alert System transmission, an Amber Alert, a severe weather notification, and a Homeland Security Advisory notification. The alert gateway device is incorporated within a network interface device and the alert message may then be distributed to a subscriber in any of a variety of ways, including by POTS (plain old telephone system) telephone, by data message (e.g., to a computer), by video message (e.g., via a television), by display on an alert notification device. The alert gateway device may comprise one or more external interfaces, which may be configured to communicate with at least one alert source. The alert gateway device may also comprise one or more internal interfaces, a processor in communication with the external interface(s) and internal interface(s) and/or a storage medium in communication with the processor. The storage medium may comprise instructions executable by the processor to receive an alert message, which can comprise an alert, via the external interface(s). The instructions may be further executable to interpret the alert message, determine how to provide the alert to the subscriber, format the alert in such a way as to facilitate the provision of the alert in a determined manner and/or, using the internal interface, provide the alert to the subscriber, perhaps according to the determination of how to provide the alert to the subscriber. The subscriber devices may acknowledge the receipt of the alert. The alert system only distributes alert messages from authorities but does not collect user specific alert information.

U.S. Patent Application No. 2005/0031095 to Pietrowicz discloses a dial-out voice notification system. This dial-out voice notification system broadcasts messages that contain relatively large amount of content to a plurality of customer premises devices. The dial-out voice server initiates a plurality of telephone calls to a plurality of telephone numbers associated with customer premises alerting devices. The dial-out server also transmits a control data signal to the alerting devices, which indicates an incoming voice message to the alerting devices. When an alert message is received this voice notification system initiates a plurality of telephone calls to cell phones and regular telephone and customer premises devices notifying the users of the alert. The dial-out notification voice message may include control data signals that enable special features of customer premise devices. This system does not collect imminent emergency situation data. There is no administrator provided within the system that evaluates the alert messages received according to the needs and preferences of a subscribed user. The system merely dials out voice notifications to telephones and cell phones and does not communicate alerts using multiple platforms. No provision is made for a customized user specific web page that documents the alert.

U.S. Patent Application No. 2005/0031096 to Postrel discloses a command synchronization method and system. The command synchronization is a method of operating a notification and response system. A user using a toll free number accesses this universal communication system to register the user and use the system. The user can send alerts to other users connected to the universal communication system using various features and parameters available within the system. The system does not collect data on imminent emergency situations. It merely provides users with alert and other information.

U.S. Patent Application No. 2005/0197775 to Smith discloses user-centric event reporting. The system and method is for receiving hazard and event information in a mobile unit and using that information to warn a user of an event or future hazard with reference to the mobile unit's location and/or intended direction of travel. The system uses mobile units with GPS or user input location data. The system receives hazard and event information and provides a warning based on location and movement of the user. A hazard location algorithm compares a forecast location of each mobile unit with a forecast hazard and transmits a warning to each mobile unit that is predicted to encounter the hazard. As the mobile unit moves, its actual position is updated in an event center, and a revised warning is transmitted to the mobile unit as applicable. The system does not take into account the user's imminent emergency alert situation needs. No disclosure is contained within the '776 published patent application concerning a system administrator that tailors the issued alert according to the needs of the user.

Foreign Patent Application No. JP 03201758 to Marufuji et al. discloses urgent simultaneous notice equipment by telephone network. A subscriber line of a subscriber telephone network is installed over a wide area. An urgent notice is transmitted through simultaneous sounding from plural speakers connected by multiple connection function of a digital telephone exchange. A telephone-based system uses multiple speakers to announce an alert. The system disclosed by Marufuji et al. does not collect imminent emergency situations and does not deliver alerts to subscribed users using multiple platforms.

Foreign Patent Application No. JP 2003242580 to Yunoki discloses an emergency information notification system, an information terminal used therewith, and an emergency information notification service method. An emergency information notification device communicates the emergency information and a Java program to a base station. A cell phone terminal downloads the Java application and uses the program to determine the location of the emergency information device, which prepares evacuation map routes and delivers the map to the cell phone. The Yunoki system merely relays the emergency alert. It does not collect imminent emergency situations. Emergency information is not delivered according to the preferences of the user.

Foreign Patent Application No. EP 1209886 to Stevens discloses a system, controller and method for alerting mobile subscribers about emergency situations. This wireless system, controller and method alert a mobile subscriber about an emergency situation including, for example, a weather alert, a hostage situation or a hazardous material leak. An emergency warning system generates information identifying a geographic area in which there is an emergency situation. The system includes a controller capable of receiving information identifying the troubled geographic area. The controller requests and receives from a wireless communications network a list of the mobile subscribers currently located within the troubled geographic area. Thereafter, the controller initiates an emergency notification message that is sent to at least one of the mobile subscribers based on special instructions provided by the user stored in a subscriber profile. The emergency notification message can be in the form of a page, a voice message or a short text message. Emergency situation alerts are thereby delivered according to special instructions provided by the users of the system. The Stevens system does not actively acquire hazard and imminent emergency alert situations. It only alerts mobile cell phone subscribers, and does not communicate inminent emergency alerts to the users using multiple platforms.

There remains a need in the art for a Citizen Alert System, which acquires alert preferences such as emergency preferences, operational preferences, and medical preferences of the users; collects appropriate alerts using a variety of means; and delivers the alerts to the user through a multitude of platforms, including a customized user web page so that the user is always provided with current alert information.

SUMMARY OF THE INVENTION

The present invention comprises a Citizen Communication Center that functions as an alert system, to immediately alert citizens within a targeted geographical area to a crisis, emergency or important event by broadcasting alert information over multiple delivery platforms. The alert system of the Citizen Communication Center (hereinafter the "Citizen Alert System") broadly includes: (1) an input device including a citizen registration page prompting citizens in a given geographic location for information, including phone and cellular phone numbers and e-mail addresses; (2) a storage device for storing the citizen information and for forming a citizen database; (3) an administrative access device wherein at least one administrative member is capable of accessing the citizen database; (4) connecting means for integrally connecting the database to a local intranet/internet grid; (5) the input device further including an administrative page that is populated by the administrative member through the entry of alert information; (6) the administrative page further comprising a confirmation page that confirms the alert information to be broadcast; and (7) an output device for broadcasting the important information to each of the citizens over multiple delivery platforms. Preferably, the delivery platforms comprise (i) cell phone text; (ii) email messages; and (iii) a secure website page updated periodically with alert information.

In a time of crises, emergency or significant event, it is critically important that alert messages reach intended recipients immediately. The Citizen Alert System updates citizens within a targeted geographical area on information they wish to receive and provides each citizen participant with an option to de-register from the system at anytime. Citizens register to receive these updates by accessing a secure location on the web. Alerts can include national emergencies, public health concerns, terror strikes, neighborhood warnings, and natural disasters, as well as school closings and events prompting parental concern. These alert categories represent but a few of the many practical uses for the System. Advantageously, the Citizen Alert System provides a method and means for immediately informing citizens of emergency situations via alerts broadcast over multiple delivery platforms. The main objective of the Citizen Alert System is to have the instant ability to quickly and reliably warn and alert citizens to information of interest that they want to receive, based on primary residence, neighborhood, district and municipality.

Key features associated with the use of the Citizen Alert System include, in combination, the features set forth below:

1) a system that services a number of subscribed users;
2) each subscribed user provides easily changeable 'user specific data' comprising multiple contact information such as telephone number, cell phone number, e-mail address, physical street address and declared sensitivities with respect to natural or man made emergency situations and professional requirements;
3) the system creates a database of user preferences in a system storage device;
4) the system collects real time data using the Internet and other proprietary databases, including homeland security links and law enforcement links related to imminent emergency situations that affect the user, such as warm or cold climatic conditions, heavy rain, icing conditions, tornado approaches, hurricane warnings, earthquake predictions, biohazard and chemical hazard threats issued by authorities, traffic accidents and chemical spills close to user's address;
5) a local or remote administrator of the system, typically a person or an artificial intelligence program, evaluates the data gathered and creates an alert information page specific to a user; and
6) communication of the emergency alert to the user using multiple platforms, such as synthesized voice phone calls, cell phone text messages, e-mail messages, and a user specific web page containing updated alert information;

whereby the user is provided with specific emergency alert information in real time that matches the user specific data.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
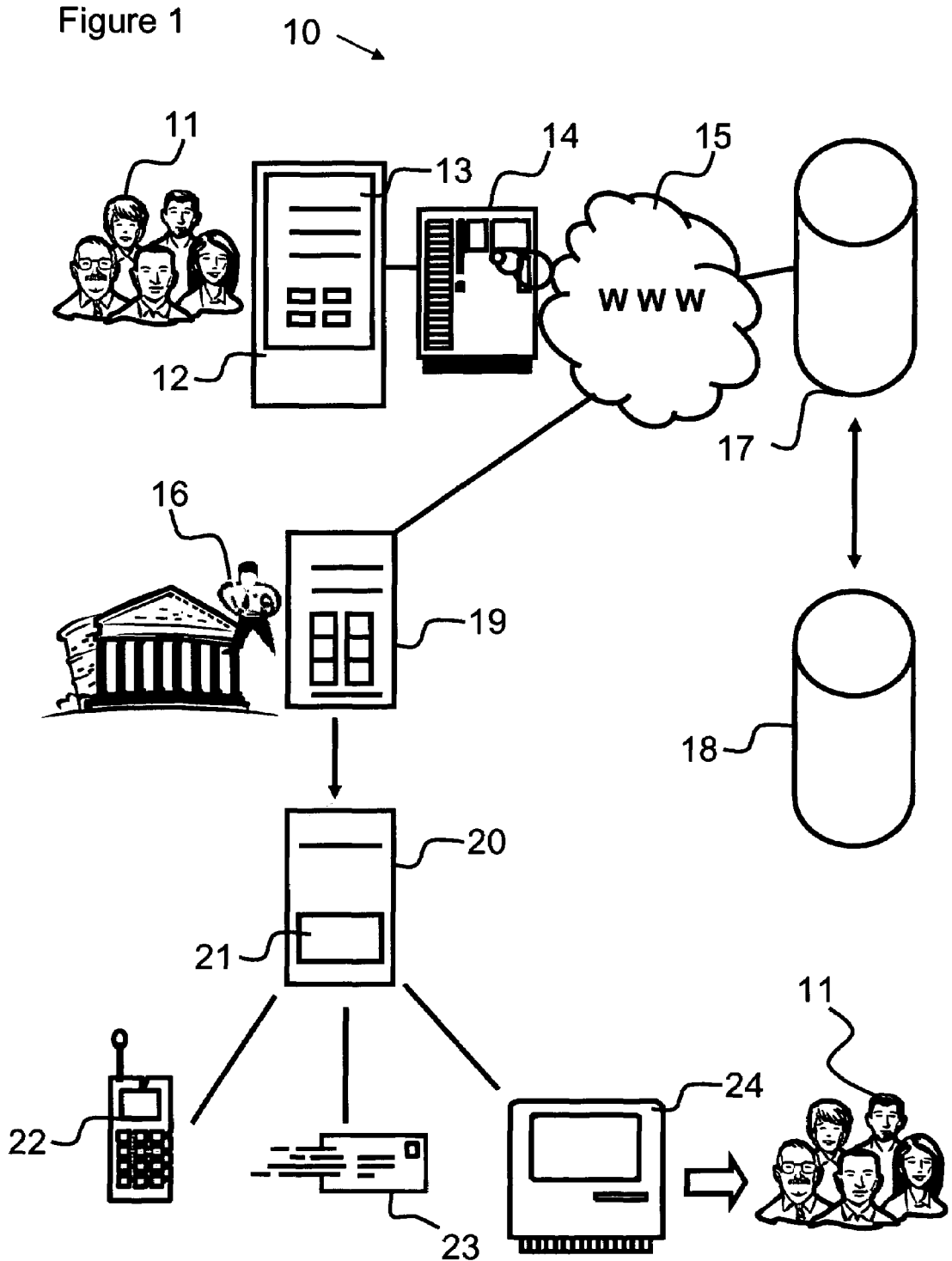
FIG. 1 is a schematic diagram depicting the Citizen Alert System.

The present invention relates to a Citizen Alert System that accesses information from a wide variety of resources including the Internet and private databases that relate to user specific hazard and professional information. An administrator, situated locally or remotely, digests the gathered data and assembles user specific alert information. The administrator may be a person having access to the system's information gathering resources, or an artificially intelligent computer program. The administrator has the ability to send an alert to target users via block and lot. This allows the administrator to send a message targeted to a single household. The administrator has the ability to send documents, images, audio and video files to the users. While the system is an alert based system, this component of the system allows the administrator to provide instructions, give visuals about an event, missing person, and the like. These instructions, photos, audio and videos are simultaneously published on the web for users to download, forward and print. The administrator does not have the ability to export or use this highly private citizen data in a manner other than intended by the system architecture. This restriction is important, as it protects the members' private information and promotes trust and confidence in the system. Alert data is communicated to the user using a variety of platforms, including voice synthesized telephone messages delivered to mobile or land-line telephones, text messages to cell phones or PDA, e-mail messages to user defined e-mail addressees, which may be read by portable devices such as Blackberry, and a secured web page indicating the alert data delivered. The alert data is updated as a function of time and is transmitted to all platforms defined by the user in the user preference data.

Generally stated, the invention comprises a system for immediately alerting citizens within a targeted geographical area to a crisis, emergency or important event by broadcasting alert information over multiple delivery platforms The Citizen Alert System broadly includes: (1) an input device including a citizen registration page prompting citizens in a given geographic location for information, including phone and cellular phone numbers and e-mail addresses; (2) a storage device for storing the citizen information and for forming a citizen database; (3) an administrative access device wherein at least one administrative member is capable of accessing the citizen database; (4) connecting means for integrally connecting the database to a local intranet/internet grid; (5) the input device further including an administrative page that is populated by the administrative member through the entry of alert information; (6) the administrative page further comprising a confirmation page that confirms the alert information to be broadcast; and (7) an output device for broadcasting the important information to each of the citizens over multiple delivery platforms. Preferably, the delivery platforms comprise (i) cell phone text; (ii) email messages; and (iii) a secure website page updated periodically with alert information.

The hardware of Citizen Alert System works in cooperation with the software which is an Internet and communication software that provides emergency, government, security and business professionals with the ability to log in and send a message to a targeted registered universe of users instantly by way of the multiple delivery platforms, including: e-mail, SMS (cell text) and web publishing. These emergency and important messages are sent instantly to each of these delivery platforms by the administrator at the click of a button. In addition, documents and postings of information are uploaded and hyperlinked for the individuals to download and receive more information and instructions. The recipients of the alerts have to pro-actively register in order to subscribe to the various alerts due to the personal information that is collected. Citizen registration is the key feature that links the ability of the system to provide alerts by collecting sensitive data from users. Citizens may refer, recruit and inform other neighboring citizens of the utility of the citizen alert system and provide information on its worthwhile benefits, thereby encouraging citizen registration. In the first case, the Citizen Alert System is usable by municipalities to transmit alert information to township citizens, township employees, and local businesses. Citizens in a specific township will have the ability to register themselves in order to receive these alert notifications. Township employees will have their own registration login as well as local businesses. Within this software there is a citizen referral registration component that will allow citizens to invite other citizens that reside in the same town to learn about the service and encourage them to become registered. This component will aide in the registration process of citizens. In addition, the software will be providing the municipalities with a tangible citizen registration kit, which will include various strategies, technologies and grassroots, public relations and media tactics in order to help citizens get registered for these alerts.

In the second case, the county government officials, agencies, OEM, security, employees, along with the respective township first responders and OEM directors and other township personnel may use the Citizen Alert System. The citizen alert software will provide county government with the administration control to send the alerts to the respective groups. The county administrator will be in charge of notifying the above in cases of an emergency.

In the third case, the state government to all counties and municipalities may take advantage of the Citizen Alert System. A state government OEM and emergency director sends instant alerts using the citizen alert software engine to OEM directors of the county and municipalities upon learning of a possible threat. Townships will be registered in a similar fashion as the citizens in a municipality, and employees to a business or government body.

In the fourth case, the Citizen Alert System may be advantageously used by corporations and businesses to alert employees, consultants and other personnel that have a relationship with the business. The citizen alert software is designed to instantly alert the above personnel on an emergency and other important news that needs to be communicated. While the system will have a variety of emergency alerts available for delivery, a business will be able to inform their employees concerning other kinds of alerts, for example,—traffic conditions, closed offices, new found business threats, security alerts, be aware of messages and the like.

In the fifth case, the Citizen Alert System may be used by membership organizations communicating with their respective members, for example, the girl scouts or boy scouts, non-profit or political organizations, can utilize the Citizen Alert System and software to communicate with their membership base instantly and deliver important news alerts and action items that their members need to perform.

In the sixth case, the citizen alert software engine will also have the ability for administrators to send attachments and important information via hyperlink in an email addressed to the recipients in order to be quickly downloaded. Such information provides recipients with the ability to perform tasks, obtain more information, and perform emergency preparedness and instructions. Since there are character restrictions on SMS communication, and full details may not be readily communicated via electronic mail, a secured web page is provided for member access to obtain additional information.

It should also be noted that while the citizen alert software is a product that is licensed by these six groups discussed above, the citizen alert software is an advocate and a spokes person for the protection of citizens' privacy. Municipalities and other government agencies do not have any access by which to export or see this private information. Employees have the ability to shield personal information from their employer at time of registration. A citizen abuse forum is provided for discussion of instances where a citizen perceives that the system has been or is being abused.

The Citizen Alert System administrator will have the ability to produce reports, track messages and get confirmations that their message has been delivered to all parties. The system provides a custom developed web, containing tailored software, hardware and a secure hosting solution that is redundant across multiple locations in order to assure complete redundancy and load balancing. The network is state of the art and is provided with appropriate security to protect and secure transmitted information. Working in conjunction with the custom developed web, and proprietary software and hardware solutions, are a practical and important grassroots component that will work with the clients to help registration. While businesses and governments will not have the registration issues that a municipality may have because of the nature of the relationship and trust, this off-line public relations and grassroots component cooperates with the citizen-to-citizen referral technology that is in place, to ensure that registration is optimized.

The present invention relates to a Citizen Alert System designed to service a number of subscribed users, each of which provides a set of user specific data to the system suited for monitoring imminent emergency situations. This user specific data conveniently may include multiple contact information including but not limited to telephone number, cell phone number, e-mail address, and physical street address. The system also requests the user to declare sensitivities to imminent emergency situations, which may include warm or cold climatic conditions, heavy rain, icing conditions, tornado approaches, hurricane warnings, earthquake predictions, biohazard and chemical hazard threats issued by authorities, traffic accidents and chemical spills close to user's address. For example, some users may be extremely concerned about falling or driving on ice, or may have difficulties when driving in heavy rain. Other users may be concerned about robbery or other events close to the user's address and the like. The user preference data is stored in the storage unit of the system and is used to evaluate the gathered emergency alerts according to the user's requirements, as set forth in the user preference data.

The Citizen Alert System is connected to the Internet and is programmed to gather information on imminent emergency situations that are of interest to the subscribed users of the system. Since the system has each user's preferences, it can search for real time information. For example, weather data can be obtained form National Oceanic and Atmospheric Administration (NOAA), and NOAA sub-organizations, including the National Weather Service (NWS) and the Emergency Managers Weather Information Network (EMWIN), the U.S. Geological Survey (USGS), and any other federal, state or local source that distributes climatic and hazardous information. The system is also connected to several intranet sites, which are secure private databases such as those used by homeland security, law enforcement and fire departments. These databases provide information regarding biohazard or chemical releases, traffic accidents, robbery and the like. Alerts can include national emergencies, public health concerns, terror strikes, neighborhood warnings, and natural disasters, as well as school closings and events prompting parental concern. These alert categories represent but a few of the many practical uses for the System. Advantageously, the Citizen Alert System provides a method and means for immediately informing citizens of emergency situations via alerts broadcast over multiple delivery platforms. The main objective of the Citizen Alert System is to have the instant ability to quickly and reliably warn and alert citizens to information of interest that they want to receive, based on primary residence, neighborhood, district and municipality.

The system parses the collected data from a number of publicly available or private databases to determine and issue user specific alerts. The system may use a local or remote administrator, which may be a person or artificially intelligent program. The artificially intelligent program is set up to prioritize the collected data according to the user's sensitivities to the emergency situations. The administrator of the system then issues an alert to the user using multiple platforms including synthesized voice phone call; cell phone text message, e-mail message and creating a secured user-specific web page with updated alert information.

While there are two or more different categories of alerts: Emergency Alerts, which are immediately broadcasted by all multimedia channels including synthesized voice communication by cell phone and land line phone communication, SMS, email, and web posting. The other important alerts are broadcasted strictly over web and email. Not every message sent requires the highest priority, or must meet the user specified criteria. There is a difference between a neighborhood watch alert and a national security emergency. Alerts concerning national security are broadcast to all users.

In FIG. 1 there is shown generally at 10 a Citizen Alert System in accordance with the invention. The Citizen Alert System 10 provides a web-based system that alerts citizens to emergency situations through multiple platforms. The Citizen Alert System includes an input device 12 including a citizen registration page 13 prompting citizens 11 in a given geographic location for user specific data or information. Such information generally includes phone and cellular phone numbers, pager, PDA, Blackberry information and e-mail addresses along with user defined sensitivities to alert situations including natural, man-made emergencies and professional requirements. The user specific data on the citizen registration page 13 is stored in a storage device 14. The information in the storage device is collated to form a user specific information database 15. An administrative access device 16 enables at least one administrative member, shown here as a person, which may be the person programming an artificial intelligence program that utilizes the user specific data to access the user specific database 15. Database 15 is integrally connected to a local Internet grid 17. The local Internet grid 17 is, optionally, connected to a plurality of Internet grids 18 in various locations including private databases, homeland security links, law enforcement links, weather data and the like. Storage device 14 stores the user specific information in a secure, private access datacenter, which is sealed across multiple servers and hot swapped over the US Internet grids. For example, one location may be in New Jersey (local Internet grid 17), while the other may be in Tennessee (second Internet grid 18). By this means, there is provided absolute redundancy, which ensures that messages are broadcasted reliably during a time of crisis.

The Citizen Alert System's input device 12 further includes an administrative page 19 that is populated by the administrative member, which may be an artificially intelligent computer program 16, through analysis of collected alert data and user specific preferences to generate an individualized user alert, generally one alert report per user. A government official will have the ability to log into the system 10 in a secure manner, and select the universe (i.e. group of citizens 11) based on their address and region or town to issue a particular alert. The administrative page 19 further comprises a confirmation page 20 that confirms the alert information to be broadcast to the specific citizens. An output device 21 broadcasts the important information to each of the citizens 11. The output device 21 includes a communicative mechanism that comprises multiple broadcast delivery platforms. The administrator 12 confirms the message and selects the broadcast delivery options 21. Such broadcast delivery options 21 include voice synthesis and delivery by telephone, cell phone, SMS text messaging (cell phone) 22, e-mail 23, and user specific web page bulletins 24 which have details of the user specific alert information and hyperlinks for additional information. The citizens 11, within a targeted geographic region, will be alerted based upon information they have provided to the citizen database 15. One or all of these broadcast platforms can be utilized to submit an alert message to citizens within the targeted geographical area. The submission process produces a confirmation page, enabling the administrator to review all pertinent criteria before sending the message to a defined citizen universe within a geographical location or region of a municipality. Citizens will instantly be informed by multiple broadcast delivery platforms and thereby hear of the immediate concern and how to learn more by accessing a specific location on the web.

The Citizen Alert System is capable of integrating with other technologies currently extant in today's marketplace (i.e. reverse 911 and IP mass telephone technology to household land lines). In addition, the Citizen Alert System provides the ability for citizens to receive, in addition to text-based alerts, audio wave file recordings.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A Citizen Alert System, comprising:
   a plurality of subscribed users, each providing user specific data comprising multiple contact information including telephone number, cell phone numbers, PDA or Blackberry access, e-mail address, physical street address and declared sensitivities with respect to natural or man made emergency situations and professional requirements in an initial registration process;
   a computer system with storage to retain securely said user specific data;
   said computer system connected to Internet and private data bases, homeland security links, law enforcement links and weather information acquiring current information that meet needs of said subscribed users based on users address and declared sensitivities;
   a local or remote Citizen Alert System administrator evaluating collected information and ordering according to user specific preferences and physical location to generate user specific alert information;
   delivering said user specific alert information to said user using multiple platforms required by said user specific data established by said user during registration;
   said Citizen Alert System posting a user specific web page providing detailed alert information and hyperlinks for obtaining additional information;
   whereby the user is provided with specific alert information in real time that matches user specific preferences declared by the user.

2. A Citizen Alert System as recited by claim 1, wherein said local or remote administrator is an artificially intelligent computer program.

3. A Citizen Alert System as recited by claim 1, wherein said local or remote administrator is an operator programming an artificially intelligent computer program.

4. A Citizen Alert System as recited by claim 1, wherein said user specific data can be easily changed by the user.

5. A Citizen Alert System as recited by claim 1, wherein said user specific data includes sensitivities to natural emergency situations, including warm or cold climatic conditions, heavy rain, icing conditions, tornado approaches, hurricane warnings, and earthquake predictions.

6. A Citizen Alert System as recited by claim 1, wherein said user specific data includes sensitivities to man-made emergency situations including public health concerns, terror strikes, neighborhood warnings, biohazard and chemical hazard threats issued by authorities, traffic accidents and chemical spills close to the user's residential address.

7. A Citizen Alert System as recited by claim 1, wherein said user specific data includes sensitivities to man-made emergency situations including public health concerns, terror strikes, neighborhood warnings, biohazard and chemical hazard threats issued by authorities, traffic accidents and chemical spills close to the user's business address.

8. A Citizen Alert System as recited by claim 1, wherein said user specific data includes sensitivities to professional tasks, including school or office closings, events prompting parental concern, and team coordination of specific tasks.

9. A Citizen Alert System as recited by claim 1, wherein said system is used by municipalities and government officials to issue alerts to first responders in an emergency.

10. A Citizen Alert System as recited by claim 1, wherein said system is used by businesses to issue alerts to business employees and consultants of emergency situations, traffic conditions, closed offices, new found business threats and security alerts.

11. A Citizen Alert System as recited by claim 1, wherein said system is used by membership organizations to issue alerts that coordinate the activities of team members.

12. The Citizen Alert System as recited by claim 1, wherein said system posts an additional web page that logs all the alerts delivered by the system with hyperlinks for additional information.

* * * * *